United States Patent

Mathews et al.

Patent Number: 5,553,482
Date of Patent: Sep. 10, 1996

[54] LEAK DETECTOR

[75] Inventors: Wayne Mathews, Milford, Pa.;
William V. Hughes, Randolph, N.J.

[73] Assignee: The United States of America as represented by the Secretary of the Army, Washington, D.C.

[21] Appl. No.: 498,711

[22] Filed: Jul. 3, 1995

Related U.S. Application Data

[63] Continuation of Ser. No. 273,559, Jul. 11, 1994, abandoned.

[51] Int. Cl.⁶ .......................... G08B 21/00; G01M 03/26
[52] U.S. Cl. .................. 73/40; 73/49.2; 73/45.4; 340/603; 340/635; 340/517; 165/11.1
[58] Field of Search .................... 73/40, 49.2, 49.3, 73/49.2 T, 40.5 R, 45.4, 40.7; 165/11.1 R; 340/517, 605, 603, 635, 643

[56] References Cited

U.S. PATENT DOCUMENTS

| | | | |
|---|---|---|---|
| 3,375,702 | 4/1968 | Birman | 340/690 |
| 3,712,112 | 1/1973 | Widmer et al. | 73/37 |
| 3,973,249 | 8/1976 | Yokote et al. | 340/242 |
| 4,337,820 | 7/1982 | Pierce | 165/11 R |
| 5,066,944 | 11/1991 | Slocum | 340/603 |
| 5,228,329 | 7/1993 | Dennison | 73/49.1 |

*Primary Examiner*—Hezron E. Williams
*Assistant Examiner*—J. David Wiggins
*Attorney, Agent, or Firm*—Saul Elbaum; Edward Goldberg; Michael C. Sachs

[57] ABSTRACT

A leak detector is provided for detecting and indicating a leak opening of a seam in a mortar increment container or the like. This will work with porous or non-porous materials. The leak detector includes a plurality of thermistors arranged to sense selective portions of the seam, and a process circuit for receiving respective signals from the thermistors for identifying and displaying a leak condition or a no-leak condition or a bad-thermistor condition.

1 Claim, 12 Drawing Sheets

LEAK DETECTOR

GOVERNMENTAL INTEREST

The invention described herein may be manufactured, used, and licensed by or for the Government for governmental purposes without the payment to us of any royalty thereon.

This application is a continuation of a U.S. application Ser. No. 08/273,559, filed on Jul. 11, 1994, which became abandoned on Jan. 22, 1995.

FIELD OF THE INVENTION

The invention described herein generally relates to a leak detector, and in particular the invention relates to a thermal leak detector, which has a plurality of thermistor-type sensors that sense a mortar increment container seam leak, opening or the like, a sensor head which holds the sensors, and electronic circuitry which processes the sensed data.

BACKGROUND OF THE INVENTION

A prior art method has been used to determine the presence of seam openings. The item seam is held by a testing person (e.g., near face) while air is injected into the item's fill hole. A seam breach is determined if air leakage is felt by the tester. This method proved to be highly subjective, unreliable, and inconsistent in that bad parts exhibiting seam leakage were shipped to the field. This forced the manufacturer to perform 100% product rework resulting in added cost.

One problem with the prior method is that it is subjective, unreliable and inconsistent in its performance.

One object of the present invention is to provide an apparatus, which is objective and reliable and consistent in its performance in detecting leak openings.

SUMMARY OF THE INVENTION

According to the present invention, a leak detector is provided. This detector is used for sensing a seam leak opening in a mortar increment container seam, or the like. This detector includes a plurality of thermistor-type sensors, a sensor head which holds the sensors, and process circuitry which receives data from the sensors and which processes the sensed data for output to a process controller, or the like.

By using a plurality or thermistor-type sensors and process circuitry, an objective and reliable and consistent performance in detecting leak openings is provided.

BRIEF DESCRIPTION OF THE DRAWINGS

The foregoing and other objects, features and advantages will be apparent from the following description of the preferred embodiment of the invention as illustrated in the accompanying drawings.

FIG. 1C and 1A show channels 1–4 and FIG. 1B and 1D show channels 5–8.

DESCRIPTION OF THE PREFERRED EMBODIMENT

As shown in FIG. 1, a leak detector 10 is provided. Assembly or leak detector 10 includes a leak sensor unit 12 and a processing circuit 14.

Figure 10:
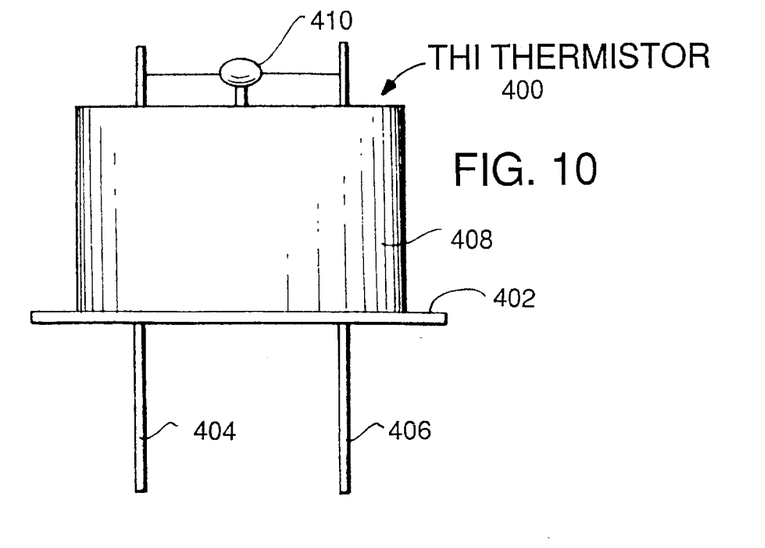
FIG. 10 is an elevation view of a typical thermistor of FIG. 1.
Figure 11:
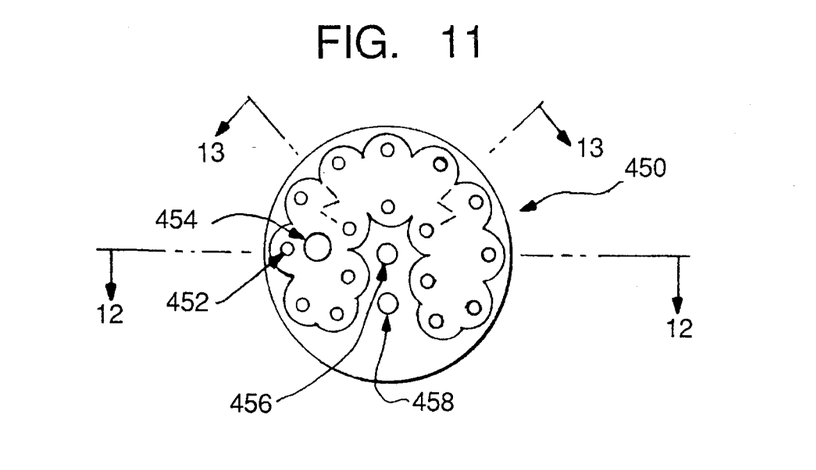
FIG. 11 is a plan view of a holder for supports of the thermistors of FIG. 1.
Figure 12:
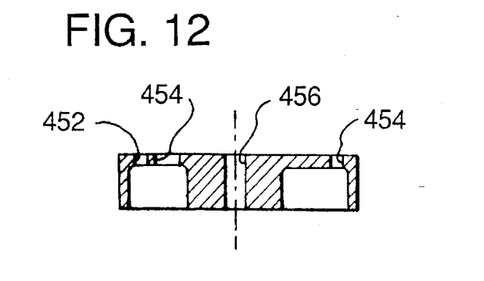
FIG. 12 is a section view as taken along the line 12—12 of FIG. 11.
Figure 13:
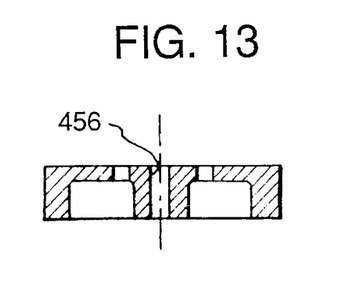
FIG. 13 is a section view as taken along the line 13—13 of FIG. 11.

Sensor unit 12 has sixteen thermistors TH1 through TH16, as shown in FIG. 1, and has a head or holder 16, as shown in FIGS. 11, 12, 13. Thermistor TH1, which is identical to thermistors TH2 through TH16, is shown in FIG. 10. Sixteen baffles (not shown) are disposed about the circumference or perimeter of a seam of a mortar increment container (not shown), or the like, for checking the seam for a leak opening. The baffles surround the respective thermistors TH1 through TH16.

Circuit 14 has a B1 control board 18 and has a B2 display or output board 20. Circuit 14 has four, similar, parallel sub-circuits or circuit portions 22, 24, 26, 28, each processing data from four-thermistor data buses.

As shown in FIG. 1, sub-circuit 22 has an input channels 1–4 module 30, a U17 latch 32, a U14 amplifier 34, a U15 amplifier 36, and an output channels 1–4 module 38.

Input channels 1–4 module 30 has seventeen terminals, numbered 1 through 17. Terminal 1 has a conductor 40 which connects in series through a JC pin 17 and through thermistor TH1 to a conductor 42 at one end thereof. Conductor 42 connects to ground 44 at the other end thereof. Terminal 2 has a conductor 46 which connects through a JC pin 16 and through thermistor TH2 in series to a first junction or meeting MI of conductor 42. Terminal 3 has a conductor 48 which connects through a JC pin 15 and through thermistor TH3 to a second junction M2 of conductor 42. Terminal 4 has a conductor 50 which connects through a JC pin 14 and through thermistor TH4 to a third junction M3 of conductor 42. Output terminals 5, 6, 7, 8 have respective conductors 52, 54, 56, 58 which connect to respective input terminals 4, 6, 8, 10 of a U17 latch 32. Output terminals 9, 10, 11, 12, have respective conductors 60, 62, 64, 66 which connect through respective junctions M4, M5, M6, M7 to input terminals 5, 6, 7, 8 of output channels 1–4 module 38.

Input terminal 13 of input channels 1–4 module 30 has a conductor 68 which connects through a junction MS, a resistor R140, a J5 pin 4 to a +24 volts source. Junction M8 has a conductor 70 which connects through capacitor C33 to ground 72. Input terminal 14 of module 30 has a conductor 74 which connects through a junction M9 and a junction M10 in series to a +5 volts source. Junction M10 has a conductor 76 which connects through a capacitor C34 to a ground 78. Input terminal 15 of module 30 has a conductor 80 which connects in series through a junction M12, then through a junction M14, then through a resistor R10 to a ground 82. Junction M12 has a conductor 84 which connects through a resistor R11 to a +24 volts source. Output terminal 16 has a conductor 86 which connects through a junction M16 and then in series through resistors R1 through R8 to ground 88. Resistors R1 through R8 have eight parallel switches in series which connect to a junction M18 on conductor 86. Output terminal 17 connects to a ground 90.

As shown in FIG. 1, latch 32 has input terminal 24 which has a connector 92 that connects to junction M9 for supply of +5 volts. Latch 32 has input terminal 2 which has a conductor 94 that connects through a junction M20, then through junction M22, to a clock input 96. Latch 32 has output terminals 5, 7, 9, 11 which have respective conductors 98, 100, 102, 104, that connect through respective junctions M24, M26, M28, M30, and then through respective junctions M32, M34, M36, M38, to respective input terminals of output channels 1–4 module 38. Module 38 has an input terminal 10 which has a conductor 106 that connects to the +5 volts supply at junction M9. Latch 32 has an input terminal 11 which connects to a ground 108. Latch 32 has an input terminal 9 which has a conductor 110 that connects through a junction M40 to a junction M42 of a conductor 112. Junction M40 has a conductor 114 which connects through a capacitor C1, then a junction M44, to an input terminal 1 of a U18 inverter 116. Inverter 116 has an input terminal 14 which connects to the +5 volts supply line 106. Inverter 116 has an output terminal 7 which is connected to a ground 118. Inverter 116 has an output terminal 2 which has a conductor 120 that connects through a junction M46 to an inlet terminal 7 of a U18 inverter 122. Inverter 116 has four output terminals 5, 9, 11, 13 which connect to a ground 124. Inverter 116 has an output terminal 4 which has a conductor 126 that connects to junction M42. Junction M24 has a conductor 128 which connects through a R108 resistor and through junctions M48, M50, M52, in series, to a ground 130. Junctions M32, M34, M36, M38 have respective conductors 132, 134, 136, 138 which connect to respective input terminals 2, 3, 4, 5 of the U14 amplifier 34. Conductors 132, 134, 136, 138 have respective junctions which have respective conductors 140, 142, 144, 146 that connect through respective resistors R67, R68, R69, R70 to a ground 147. Junctions M26, M28, M30 have respective conductors 148, 150, 152 which connect through respective resistors R109, R110, R111 to respective junctions M48, M50, M52. Junctions M4, M5, M6, M7 have respective conductors 154, 156, 158, 160, which connect to respective terminals 2, 3, 4, 5, of U16 amplifier 36.

As shown in FIG. 1, conductors 154, 156, 158, 160 have respective junctions which have respective conductors 162, 164, 166, 168 that connect through respective resistors R83, R84, R85, R86 to ground 147.

U14 amplifier 34 has an output terminal 1 which has a conductor 170 that connects to an input terminal 1 of a U13 leak amplifier 172. U16 amplifier 36 has an output terminal 1 which has a conductor 174 that connects to an input terminal 9 of a U13 bad thermistor amplifier 176. U13 leak amplifier 172 has an output terminal 1 which has a conductor 178 that provides a leak signal. Conductor 178 has a junction M54 which has a conductor 180 that connects through a resistor R66 to ground 182. Bad thermistor amplifier 176 has an output terminal 13 which has a conductor 184 that provides a bad-thermistor signal. Conductor 184 has a junction M56 which has a conductor 186 that connects through a resistor R65 to ground. Sub-circuits 24, 26, 28 are substantially identical in structure and arrangement to sub-circuit 22.

Figure 1B:
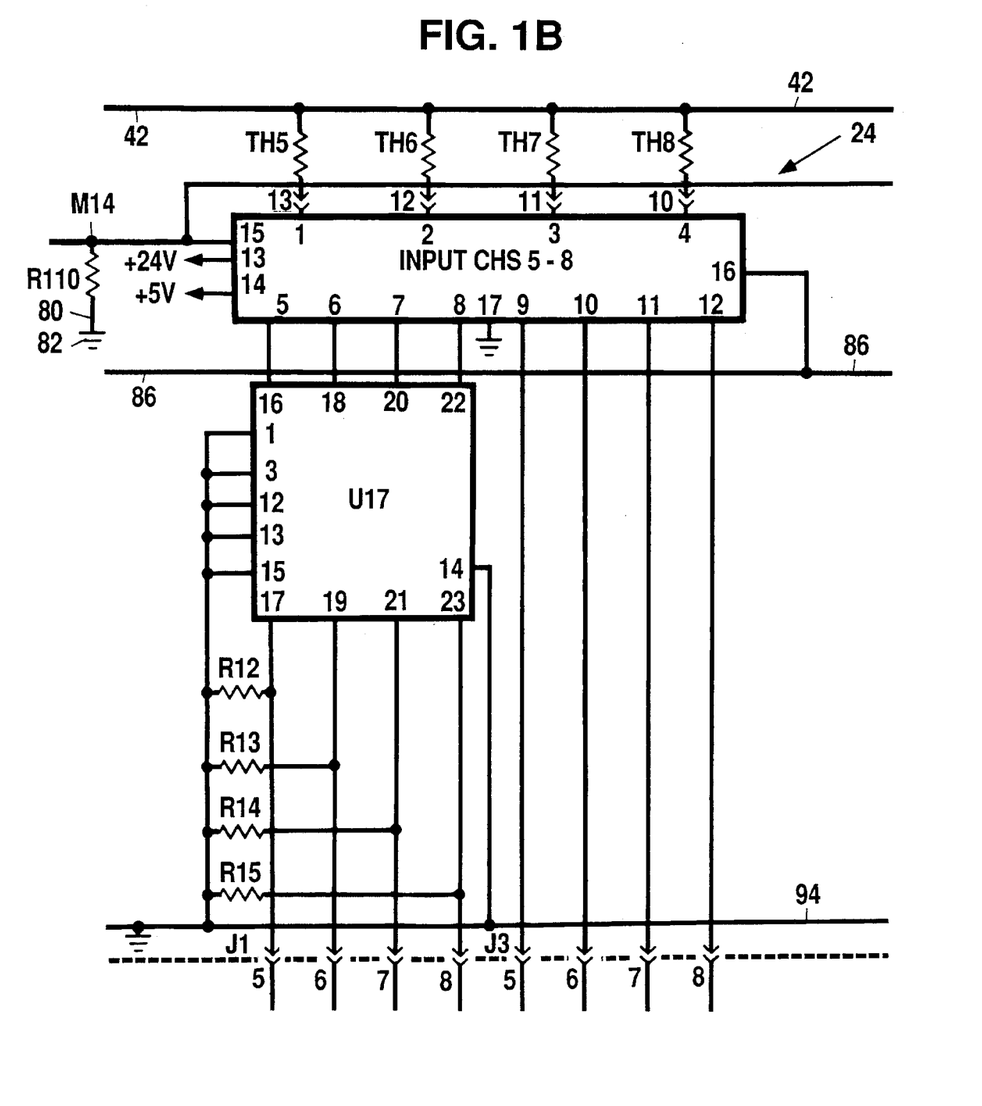
Figure 1C:
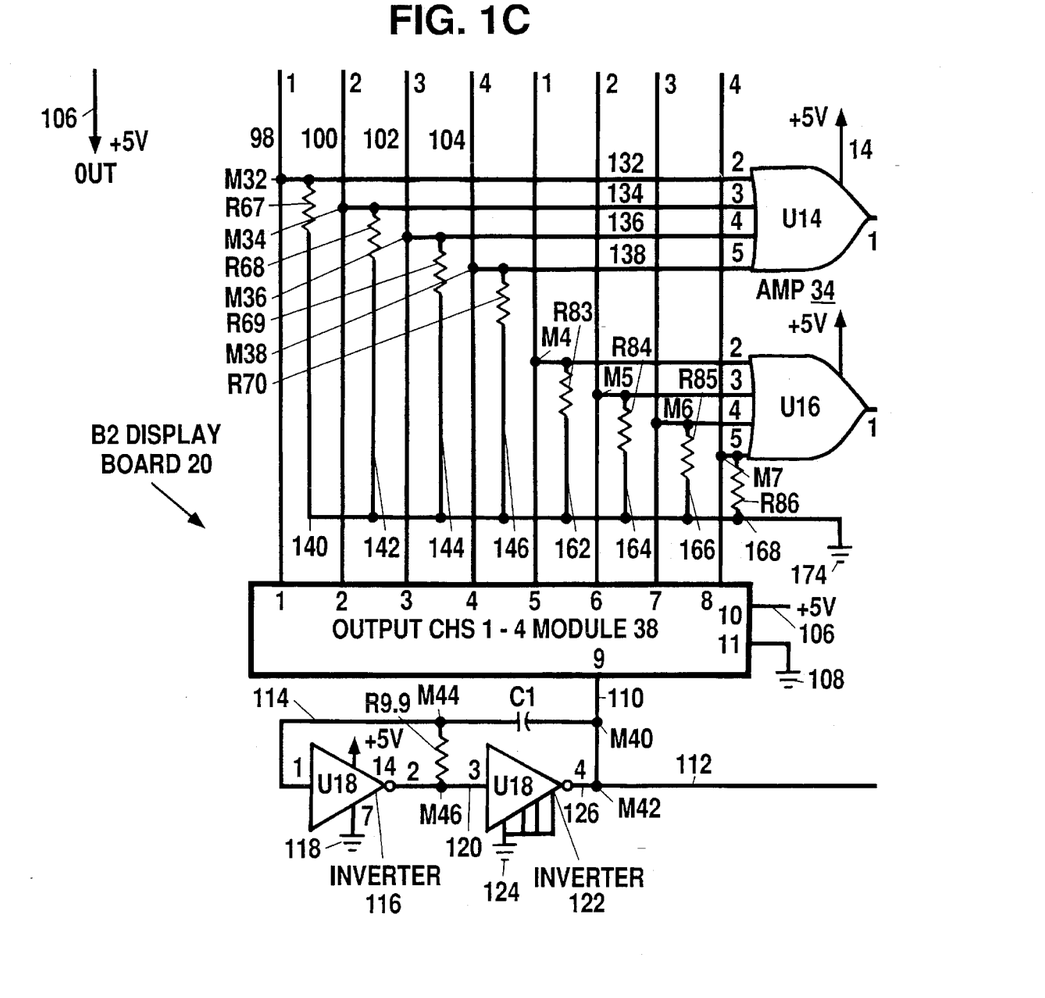
Figure 1D:
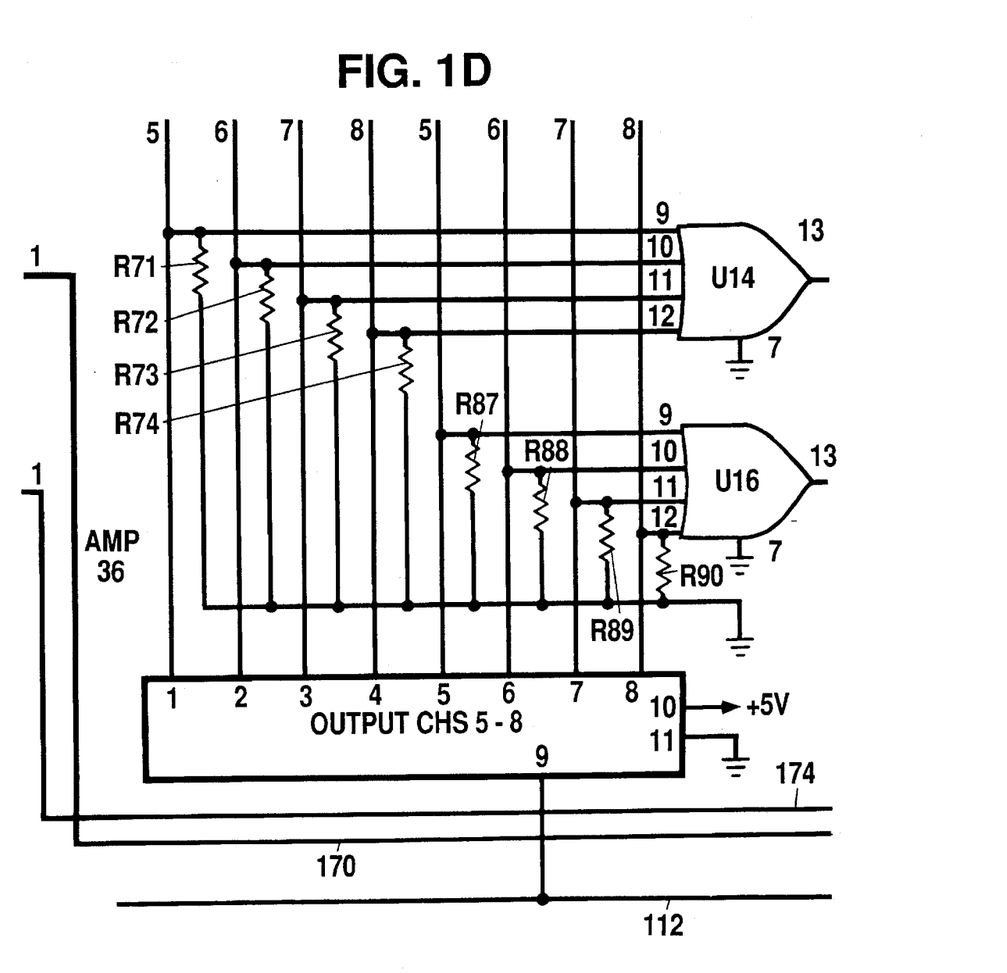
Figure 1E:
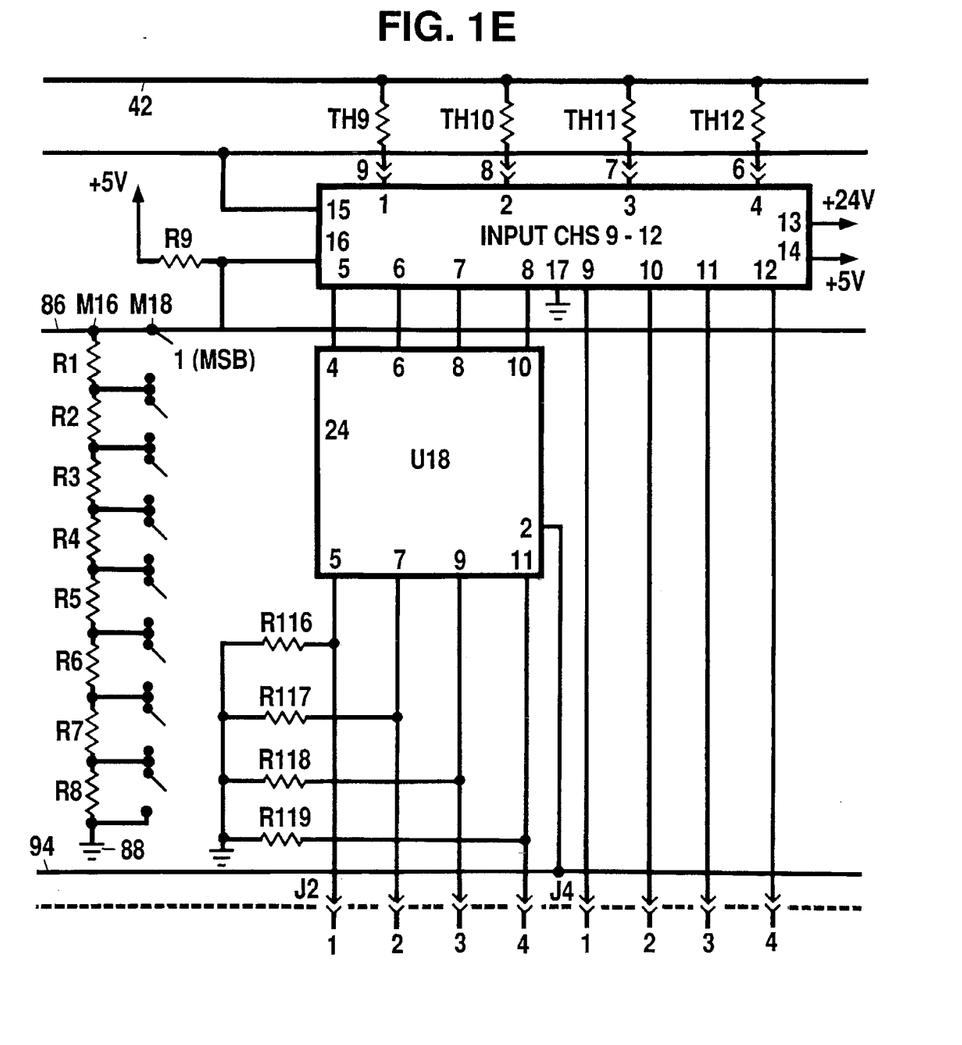
FIG. 1E and 1G shows channels 9–12 and FIG. 1F and 1H show channels 13–16 of a circuit diagram of a leak detector according to the present invention.
Figure 1F:
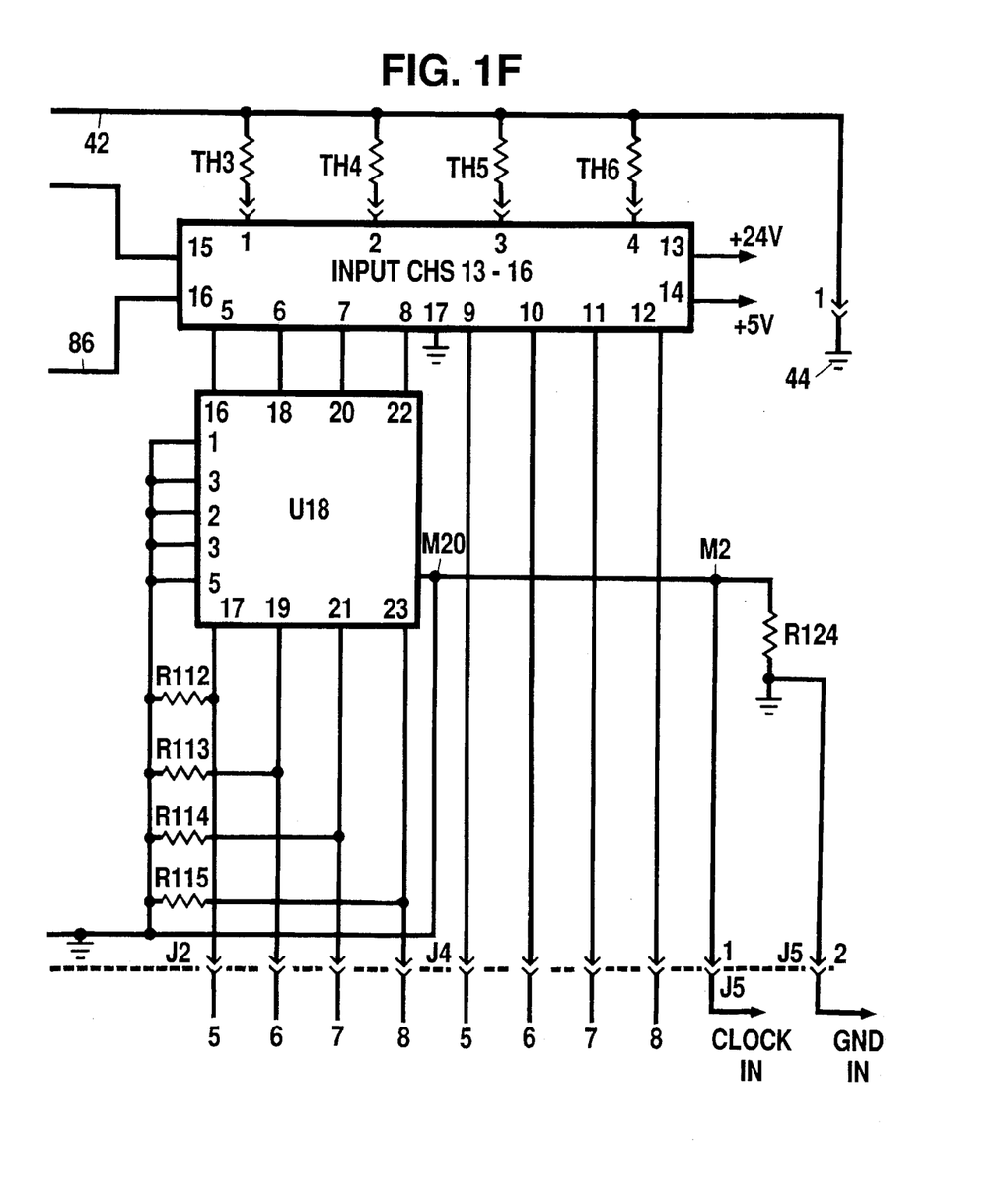
Figure 1G:
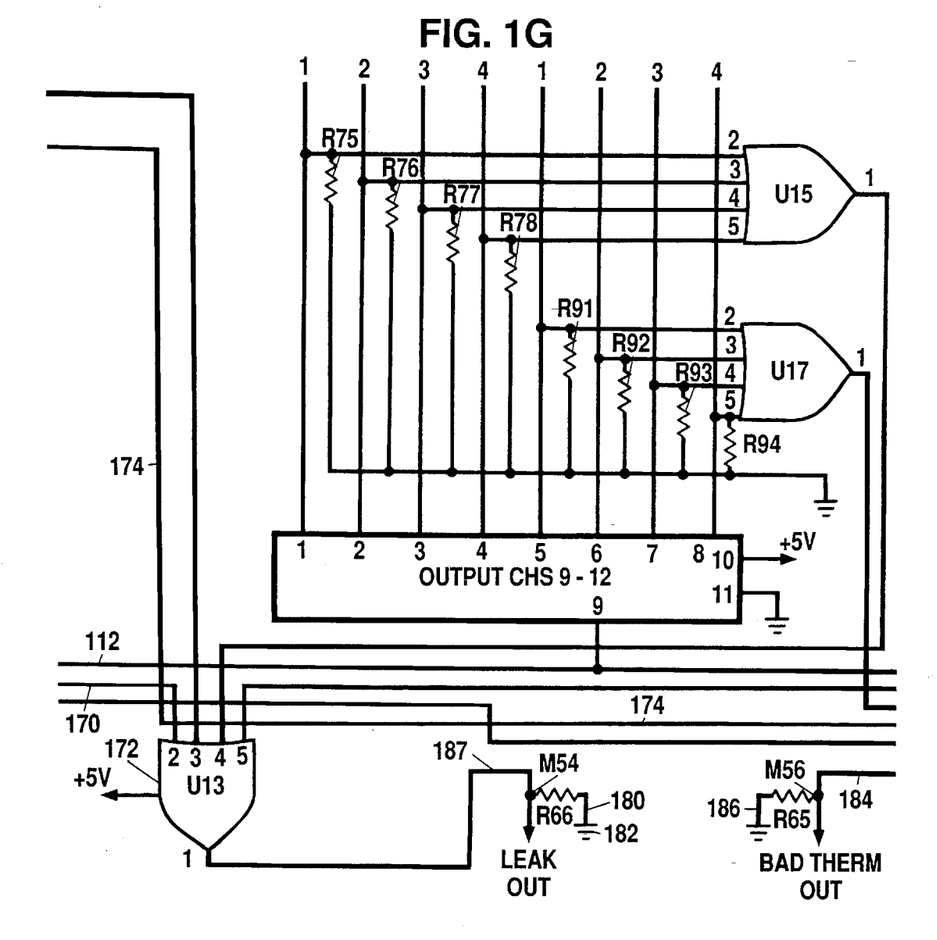
Figure 1H:
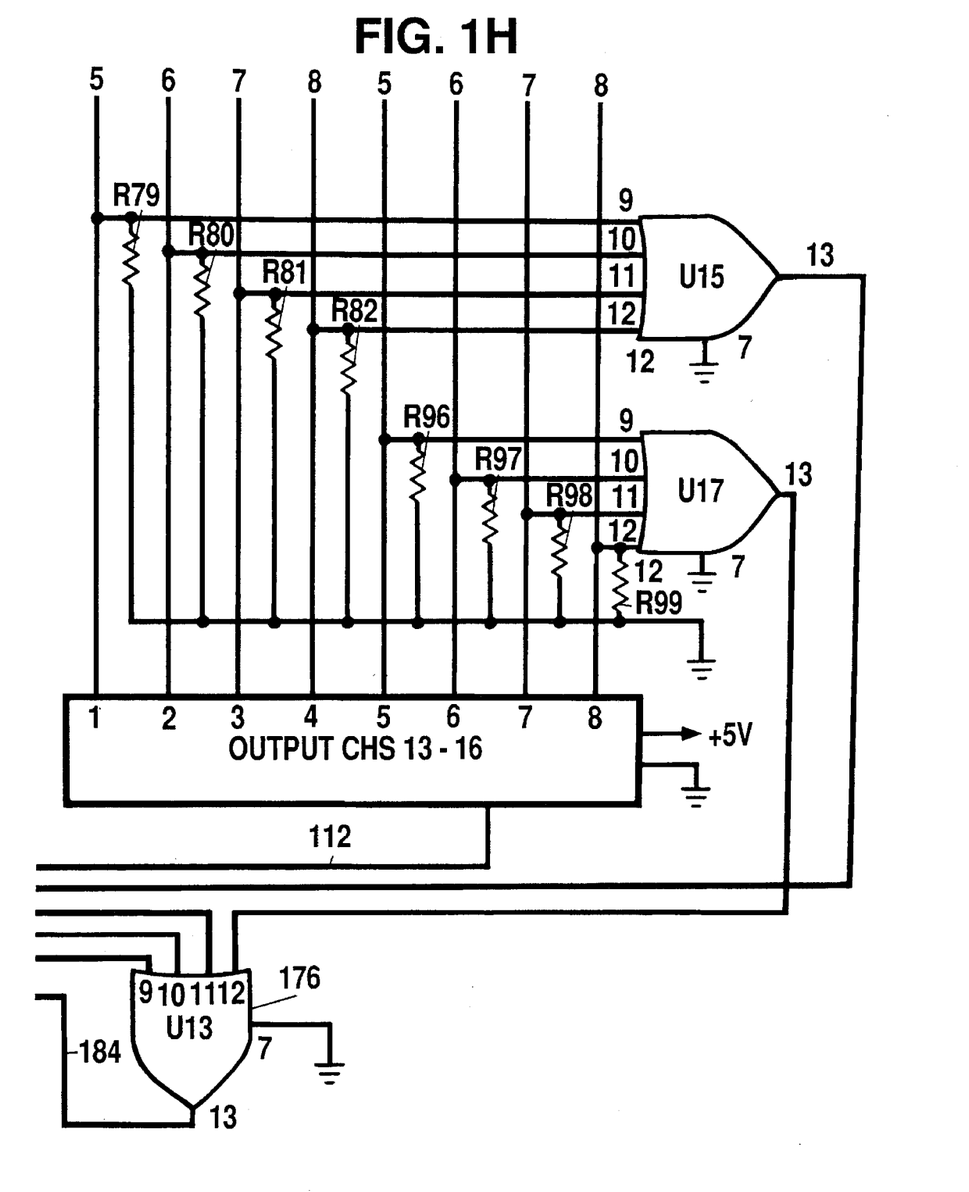
Figure 2:
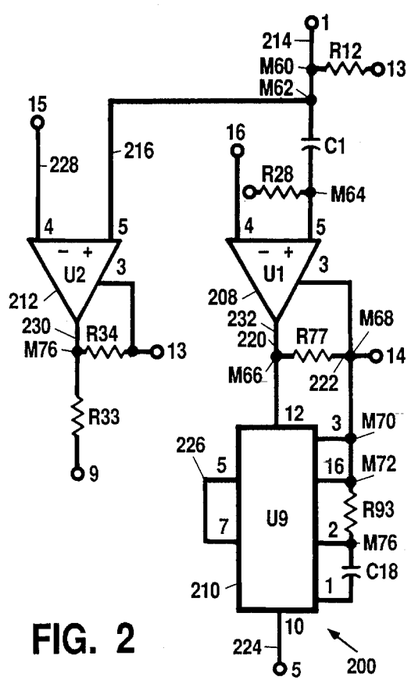
FIG. 2 is a circuit diagram of a portion of a typical input module of FIG. 1.

As shown in FIG. 2, input channels 1–4 module 30 has four module circuits 200, 202, 204, 206. Module circuit 200 has a U1 comparator 208, a U9 one shot unit 210, and a U2 comparator 212. Terminal 1 has a conductor 214 which connects through a junction M60, then through a junction M62, then through a capacitor C1, then through a junction M64, to a positive input pin 5 of U1 comparator 208. Terminal 13 connects through a resistor R12 to junction M60. Junction M62 has a conductor 216 which connects to a positive input pin 5 of U2 comparator 212. Terminal 17 connects through a resistor R28 to junction M64. Terminal 16 has a conductor 218 which connects to a negative input pin 4 of U1 comparator 208. Output pin 2 of U1 comparator 208 has a conductor 220 which connects through a junction M66 to an input pin 12 of U9 one shot unit 210. Junction M66 has a conductor 222 which connects through a resistor R77, a junction M68, a junction M70, then through a junction M72, then through a junction M74, then through a capacitor C18, to an output pin 1 of U9 one shot unit 210. Junctions M70, M72 and M74 respectively connect to pins 3, 16, 2 of U9 one shot unit 210. An output pin 10 of U9 one shot unit 210 has a conductor 224 which connects to terminal 5. Pin 5 of U9 one shot unit 210 has a conductor 226 which connects to pin 7 of U9 one shot unit 210. Terminal 15 has a conductor 228 which connects to pin 4 of U2 comparator 212. U2 comparator 212 has an outlet pin 2 which has a conductor 230 that connects through a junction M76, then through resistor R33 to terminal 9. Junction M76 has a conductor 232 which connects through resistor R34 to terminal 13.

Figure 3:
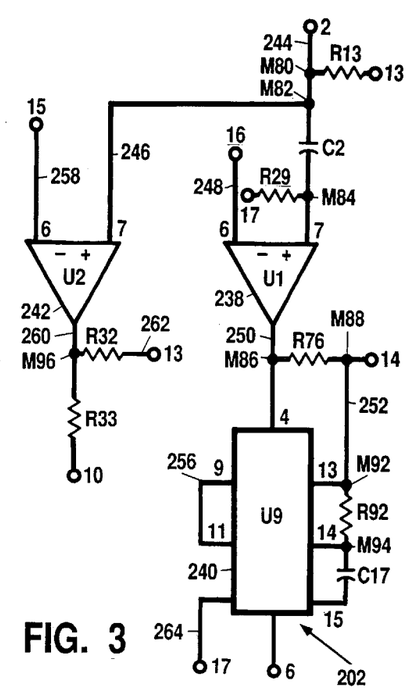
FIG. 3 is a circuit diagram of another portion of the input module of FIG. 1.

As shown in FIG. 3, module circuit 202 has a U1 comparator 238, a U9 one shot unit 240, and a U2 comparator 242. As shown in FIG. 3, terminal 2 has a conductor 244 which connects through a junction M80, then through junction M82, then through capacitor C2, then through a junction M84 to a positive input pin 7 of U1 comparator 238.

Terminal 13 connects through a resistor R13 to junction MS0. Junction M82 has a conductor 246 which connects to a positive input pin 7 of 42 comparator 242. Terminal 17 connects through a resistor R29 to junction M84. Terminal 16 has a conductor 248 which connects to a negative input pin 6 of U1 comparator 238. Output pin 1 of U1 comparator 238 has a conductor 250 which connects through a junction M86 to an input pin 4 of U9 one shot unit 240. Junction M86 has a conductor 252 which connects through a resistor R76, then a junction M88, then a junction M92, then through a junction M94 then through a capacitor C17 to an output pin 15 of U9 one shot unit 240. Junctions M92 and M94 respectively connect to pins 13, 14 of U9 one shot unit 240. An output pin of U9 one shot unit 240 has a conductor 254 which connects to terminal 6. Pin 9 of U9 one shot unit 240 has a conductor 256 which connects to pin 11 of U9 one shot unit 240. Terminal 15 has a conductor 258 which connects to pin 6 of U2 comparator 242. U2 comparator 242 has an outlet pin 1 which has a conductor 260 that connects through a junction M96, then through resistor R33, to terminal 10. Junction M96 has a conductor 262 which connects through resistor R32 to terminal 13. A pin of U9 one shot unit 240 has a conductor 264 which connects to terminal 17.

Figure 4:
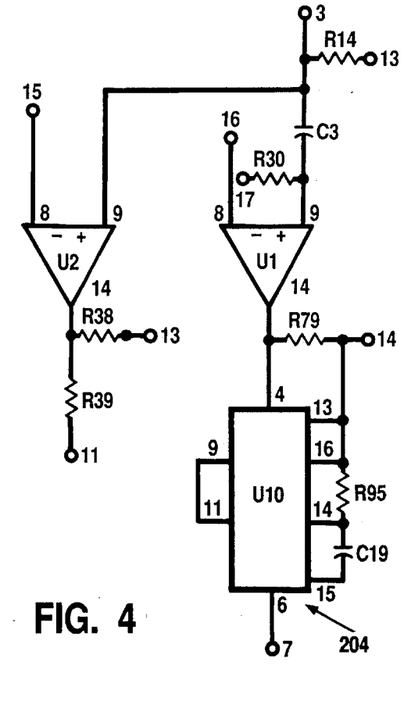
FIG. 4 is a circuit diagram of still another portion of the input module of FIG. 1.

As shown in FIG. 4, the structure and arrangement of module circuit 204 is substantially identical to that of module circuit 200, except that terminals 3, 16, 15, 13, 17, 14, 7, 13, 11 of module circuit 204 replace respective terminals 1, 16, 15, 13, 17, 14, 5, 13, 9 of module 200, and except that U10 one shot unit of module circuit 204 replaces U9 one shot unit 210 of module circuit 200, and that the corresponding pins of the comparators and one shot unit of module circuit 204 have different pin numerals.

Figure 5:
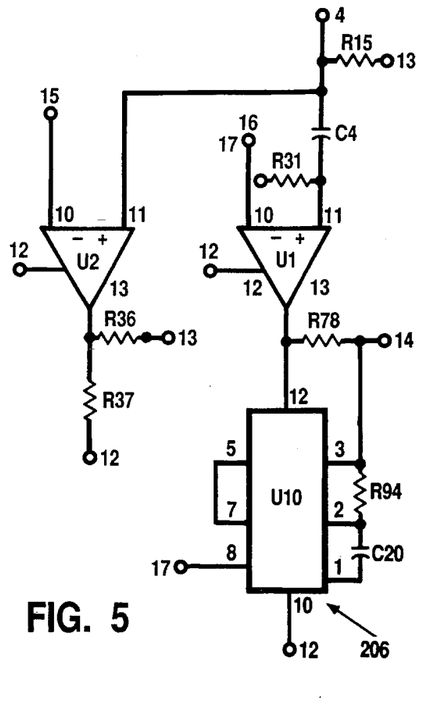
FIG. 5 is a circuit diagram of a further portion of the input module of FIG. 1.

As shown in FIG. 5, the structure and arrangement of module circuit 206 is substantially identical to that of module circuit 202, except that terminals 4, 16, 15, 13, 17, 14, 8, 13, 12 of module circuit 206 replace respective terminals 2, 16, 15, 13, 17, 14, 6, 13, 10 of module 202, and except that U10 one shot unit of module circuit 206 replaces U9 one shot unit 240 of module circuit 202, and that the corresponding pins of the comparators and one shot unit of module circuit 206 has different lead numerals.

Figure 6:
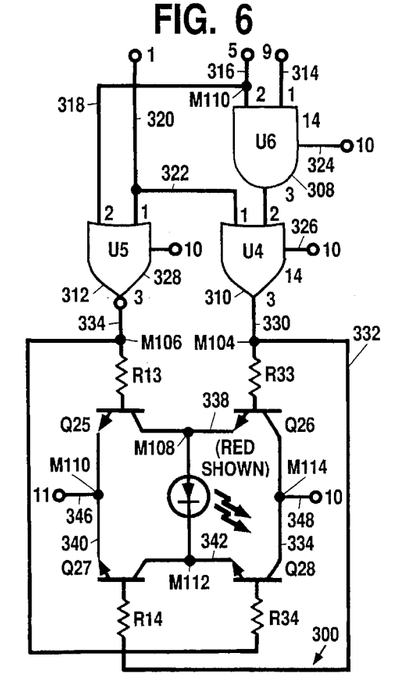
FIG. 6 is a circuit diagram of a portion of a typical output module of FIG. 1.

As show in FIG. 6, output channels 1–4 module 38 has four module sub-circuits 300, 302, 304, 306. Module circuit 300 has a U6 AND amplifier 308, a U4 OR amplifier 310, a U5 inverter 312, a Q25 transistor, a Q26 transistor, a Q27 transistor, a Q28 transistor, and a photoemissive diode DS1. Terminal 9 has a conductor 314 which connects to a lead 1 of U6 AND amplifier 308. Terminal 5 has a conductor 316 which connects through a junction M100 to lead 2 of U6 amplifier 308. Junction M100 has a conductor 318 a lead 2 of U5 inverter 312. Terminal 1 has a conductor 320 which connects through a junction M102 to lead 1 of U5 inverter 312. Junction M102 has a conductor 322 which connects to lead 1 of U4 amplifier 310. Terminal 10 has a conductor 324 which connects to lead 14 of U6 amplifier 308. Terminal 10 also has a conductor 326 which connects to lead 14 of U4 amplifier 310. Terminal 10 also has a conductor 328 which connects to a lead 14 of U5 inverter 312. U4 amplifier 310 has an output lead 3 which has a conductor 330 that connects through a junction M104 and a resistor R33 to an input of transistor Q26. Junction M104 has a conductor 332 which connects through a resistor R14 to a lead of transistor Q27. U5 inverter 312 has an output lead 3 which has a conductor 334 which connects through a junction M106 and a resistor R13 to an input lead of transistor Q25. Junction M106 has a conductor 336 which connects through a resistor R34 to an input lead of transistor Q28, transistor Q26 has a conductor 338 which connects through a junction M108 to an input lead of transistor Q25. Transistor Q25 has a conductor 340 which connects through a junction M110. Transistor Q27 has a conductor 342 which connects through a junction M112 to output lead of transistor Q28. Transistor Q28 has a conductor 334 which connects through junction M114 to a lead of transistor Q26. Junction M110 has a conductor 346 which connects to terminal 11. Junction M114 has a conductor 348 which connects to terminal 10. Junction M108 connects to one lead of diode DS1. Junction M112 connects to a second lead of diode DS1.

Figure 7:
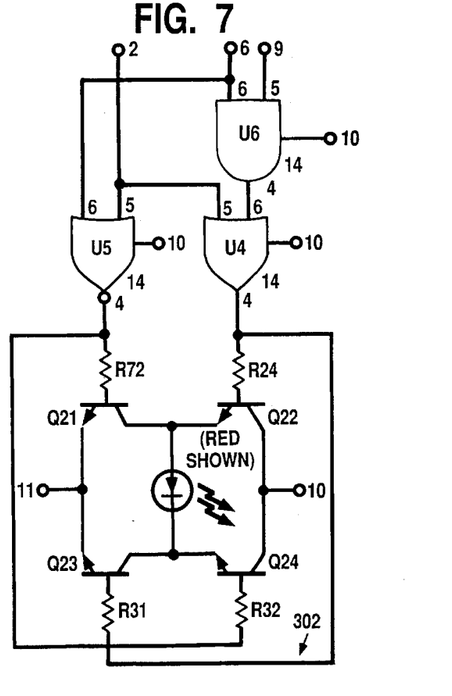
FIG. 7 is a circuit diagram of another portion of the output module of FIG. 1.
Figure 8:
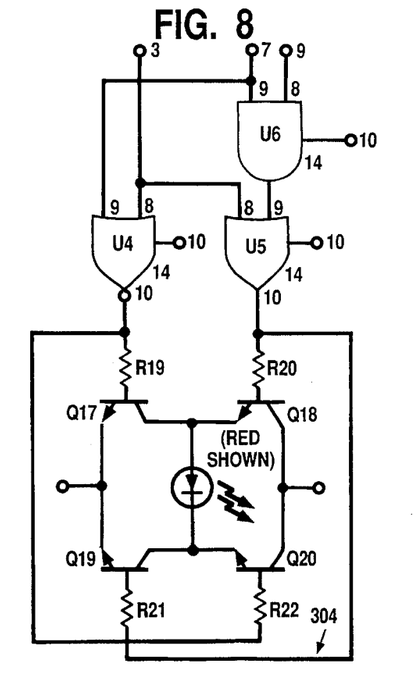
FIG. 8 is a circuit diagram of still another portion of the output module of FIG. 1.
Figure 9:
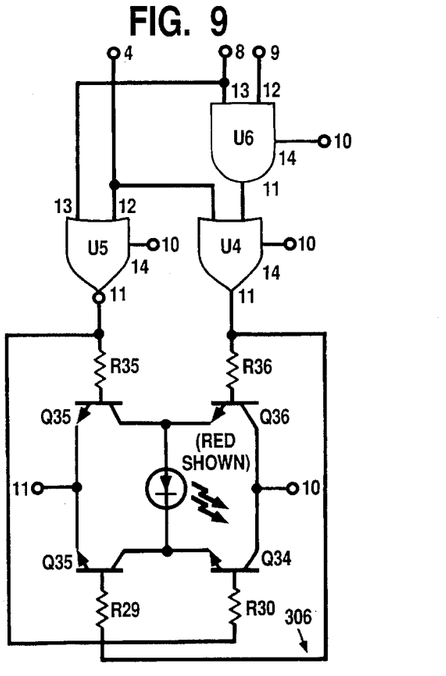
FIG. 9 is a circuit diagram of a further portion of the output module of FIG. 1.

As shown in FIGS. 7, 8 and 9, the structure and arrangement of each of the sub-circuits 302, 304, 306 is the same as that of sub-circuit 300, except that the terminals corresponding to terminals 9, 5 and 1 are partly replaced by other terminals and that the part lead numerals are replaced by other lead numerals.

As shown in FIG. 10, the typical thermistor TH1 is shown. Thermistors TH2 through TH16 are identical in construction to thermistor TH1. TH1 thermistor 400 includes a base 402 which have leads 404, 406. TH1 thermistor 400 also has a mount 408 which has a bead 410 supported thereon.

As shown in FIGS. 11, 12 and 13, TH1 thermistor 400 has a typical head or disk 450. Head 450 has sixteen thermistor holes. Hole 452 is a typical thermistor hole and is identical to the other fifteen holes. Hole 452 receives a portion of TH1 thermistor. Head 450 also has three support holes 454, 456, 458.

As shown in FIG. 10, bead 410 has design considerations as indicated hereafter, the thermistors must be composed of a fast responding bead 410. The bead 410 is glass encased for environmental protection, and is rigidly mounted on a thermally non-conductive mount 408 to guard against thermal instability which would be caused from movement of the bead 410. The thermistors are mounted around the seam being tested, and enclosed in baffles which are made to direct all leaked air across the thermistor bead 410. It is suggested that the baffles (not shown) be of spherical design and come to a knife edge at the part to reduce dead spots.

As shown in FIGS. 11, 12 and 13, head 450 is composed of a thermally non-conductive material. It is non-moving, whereby the part is brought into the test head to reduce turbulence on the sensor array requiring settling time on test (i.e., reduced response time).

Figure 14:
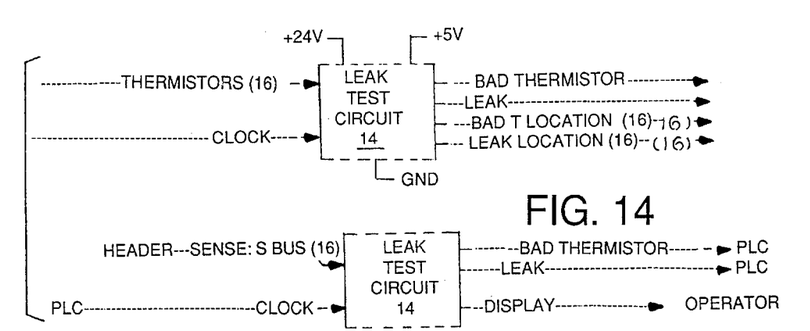
FIG. 14 is a sketch illustrating the operation of the circuit diagram of FIG. 1.

In operation, as shown in FIG. 14, which is a sketch of the operation of circuit 14, the circuit 14 supports fully automatic detection of leaks, and provides the circuitry necessary to easily interface with 16 thermistor-type sensor devices, process the sensed data, portray the desired test results in a user-friendly manner, and provide pertinent control and data outputs for use by a system process-controller and data-management facility.

Figure 15:
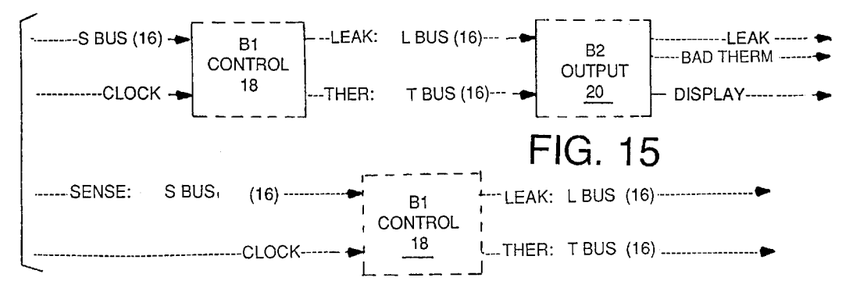
FIG. 15 is a schematic drawing illustrating the operation of parts of the circuit diagram of FIG. 1.

As show in FIG. 15, which is a schematic drawing of the operation of circuit 14, sensed data, supplied by 16 thermistors that interface with the circumference of the product-seam, is input. This data, composed of both a static (DC) and dynamic (AC) component, is processed by the B1 control board 18 to derive the such signals are carried on the T-bus and such signals are carried on the L-bus, states respectively. The B2 output board 20 processes this information to provide the defective thermistor and leak control signal outputs, and the display.

Figure 16:
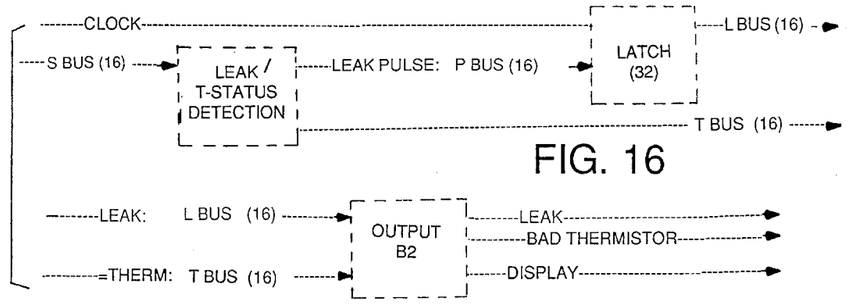
FIG. 16 is a schematic diagram illustrating the operation of additional parts of the circuit diagram of FIG. 1.

As shown in FIG. 16, which is a schematic drawing of the operation of a portion of FIG. 1, control module 30 accepts both the thermistor data (S-bus) and clock inputs and performs the following functions:

a) biases the thermistors to their proper operating point (self-heat mode).

b) processes the data transmitted by the thermistors (signals carried on the S-bus) to generate leak status (signals carried on the L-bus).

c) detects and signals the presence of a bad thermistor (signals carried on the T-bus).

Each thermistor (TH1) is biased (R12) to heat approximately 10 degrees C above ambient temperature; i.e., Channel 1 used as example throughout. At a leak point, injected ambient air blows on and cools the thermistor increasing its resistance, which results in a corresponding voltage rise at the R1-TH1 voltage divider junction. This delta V is capacitor coupled (C1, R28) to the Leak-Detection Comparator (U1). Note that the R28-C1 time constant renders the circuit insensitive to thermistor resistance changes due to variations in ambient temperature.

The leak pulse is compared (U1) to a user selectable reference. If the leak pulse is greater than this reference (i.e., leak condition), the comparator output goes high and triggers its associated one-shot (U-9), which fires for 350MSEC (R93, C18). If the leak pulse is less than this reference (i.e., no-leak condition), the comparator output remains low. P-bus data is clocked into (i.e., falling edge) the Latch (U17) where it is stored to provide the required leak-status control signals (L-bus).

The thermistor-status circuit (U2) detects and signals the presence of a bad thermistor by comparing the R1-TH1 junction voltage to a common 20 v reference (R11, 10). Under normal operating conditions, each junction voltage is less than the reference which results in all low comparator outputs. If a thermistor opens, its R1-TH1 junction goes to 24 v which drives its corresponding comparator output high. This output is converted to a 5 v level (R35, 83) to provide the required thermistor-status control signals (T-bus).

Each comparator output, being open-collector, is terminated with its own pull-up resistor (R77, 34). The 24 v supply is delayed (R140, C33) at power-up to protect the signal inputs to comparators U1 from transients.

Figure 17:
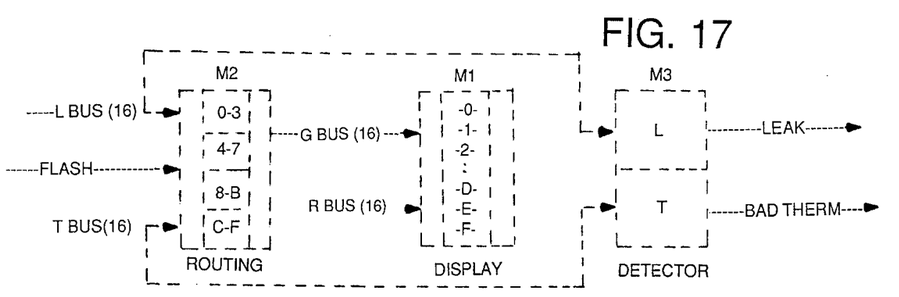
FIG. 17 is a schematic diagram illustrating the operation of additional parts of the circuit diagram of FIG. 1.

As shown in FIG. 17, which is a schematic drawing of the operation of a portion of FIG. 1, the output module accepts both the leak (L-bus) and thermistor (T-bus) status. This data is processed to provide the following outputs:

a) Leak signal.

b) Bad thermistor signal.

c) 16-location visual display:
  *No leak at location=GRN
  *Leak at location=RED
  *Bad thermistor at location=Flashing RED The routing module (U4, 5, 6) generates the G/R control signal based on the L-status (U17), and gates the flash signal to the R line based on the T-status (U2). The three valid T&L states and their corresponding R&G states are shown below:

| T | L | R | G | Q1,3 | Q2,4 | LED |
|---|---|---|---|------|------|-----|
| 0 | 0 | 0 | 1 | OFF  | ON   | GREEN |
| 0 | 1 | 1 | 0 | ON   | OFF  | RED |
| 1 | 0 | F | 0 | FL   | OFF  | FL-RED |

*1  1 = invalid

The flash circuit (U18) provides a common flash-signal to all 16 channels of the routing module. The flash frequency is fixed to approximately 1 Hz (R99, C1).

The display module produces a visual display of the desired information for each channel. Based on the R/G control status developed by the routing module, the transistor bridge circuit (Q25–28) steers current through a dual-color 2-lead LED (DS1). Base resistors R13, 14, 33, 34 are chosen to provide adequate luminance, yet limit the LED current to a safe operating level.

As shown in FIG. 17, the detector module derives the "leak" and "bad thermistor" output signals. Each of two effective 16-input OR gate channels (U13–U17) will generate its respective output if any one of its corresponding inputs is present.

The prototype of assembly 10 has the parts list as indicated hereafter.

| COMPONENT | VALUE | DESCRIPTION | QNTY |
|-----------|-------|-------------|------|
| Capacitors | 0.047 µf | Film | 1 |
|  | 0.1 µf | Film | 16 |
|  | 4.7 µf/25v | Tant; 5% | 16 |
|  | 100 µf/50v | Elec; Radial | 1 |
|  | 1000 µf/10v | Elec; Radial | 1 |
| ICs | CD4001B | Quad 2-Input NOR | 4 |
|  | CD4069UB | Hex Invertor | 1 |
|  | CD4071B | Quad 2-Input OR | 4 |
|  | CD4072B | Dual 4-Input OR | 5 |
|  | CD4081B | Quad 2-Input AND | 4 |
|  | CD4098B | Dual Monostable | 8 |
|  | CD4508B | Dual 4-bit Latch | 2 |
|  | LM339A | Quad Comparator | 8 |
| LEDS (Light Emitting Diodes) | Dual Color Red/Grn; 2-Lead | | 16 |
| Resistors | 49.9 | ¼w, 1%, Film | 1 |
|  | 100 | ¼w, 1%, Film | 1 |
|  | 150 | ¼w, 5%, Film | 1 |
|  | 200 | ¼w, 1%, Film | 1 |
|  | 402 | ¼w, 1%, Film | 1 |
|  | 806 | ¼w, 1%, Film | 1 |
|  | 1.62K | ¼w, 1%, Film | 1 |
|  | 3.24K | ¼w, 1%, Film | 1 |
|  | 4.7K | ¼w, 5%, Film | 64 |
|  | 6.49K | ¼w, 1%, Film | 1 |
|  | 8.2K | ¼w, 5%, Film | 16 |
|  | 15K | ¼w, 5%, Film | 16 |
|  | 27K | ¼w, 5%, Film | 16 |
|  | 66K | ¼w, 5%, Film | 16 |
|  | 100K | ¼w, 5%, Film | 33 |
|  | 270K | ¼w, 5%, Film | 16 |
|  | 332K | ¼w, 1%, Film | 1 |
|  | 1.2M | ¼w, 5%, Film | 4 |
|  | 6.8M | ¼w, 5%, Film | 1 |
|  | 10M | ¼w, 5%, Film | 16 |
| Switches | 8-SPST | Dip | 1 |
| Thermistors | 30K | 0.014w; 10%; 0.014" Mounted Thermobeads | 16 |
| Transistors | 2N4401 | NPN | 36 |
| Connectors: |  | 4p M/F set, F-row, 0.156 centers | 2 |
|  |  | 8p M/F set, 1-row, 0.156 centers | 8 |
|  |  | 2p M/F set, 1-row, 0.156 centers | 1 |
|  |  | Molex; 6-pin M/F set | 1 |
|  |  | 17p M/F set, 1-row, 0.156 centers | 16 |

One prototype of assembly 10 has characteristics as indicated hereafter.

a) Supply requirements: +24 v/0.35 w: +5 v/2W; 1% regulation b) 16-channel c) Dimensions: 9¹⁄₁₆"L; 7¼"W; 3¼"H d) Temperature range: 0–55 deg C.

e) Thermistor: 14 mil glass-coated bead; 30K 10 mw; 10%; tc (electrical pulse) 300 msec; ³⁄₁₆" diameter header, horizontal mount f) Outputs:

1) Leak: 5 v, 2 ms

2) Bad thermistor 5 v, 2 ms

3) Leak location: 5 v, 2 ms

4) Bad thermistor location: 5 v, 20 ms

The advantages of assembly 10 are indicated hereafter.

a) Presence and location of leak or bad thermistor is displayed by assembly 10 via single indicator per channel in 3-states: OK (green), leak (red), bad thermistor (flashing red).

b) Display 38 is arrangeable in shape of product to be tested to facilitate ease of finding and repairing leak or bad thermistor.

c) Assembly 10 is insensitive to changes in thermistor ambient temperature.

d) Sensitivity of assembly 10 is easily adjusted.

e) Assembly 10 provides outputs to process-control and data-management systems to key various control operations (e.g., accept/reject decisions) and permit automated analysis of test results.

f) Assembly 10 has low power supply requirements, uses CMOS technology, and can be adapted to interface with various leak-test applications.

g) Assembly 10 is objective and reliable and consistent in its performance in detecting leak openings.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. A leak detector, for detecting a leak opening in a seam of a mortar increment container or the like of material being porous or non-porous, said leak detector comprising:

a sensor means positioned adjacent said seam at a selected location thereof to test for presence of a leak in such seam location, said sensor means having at least one thermistor for providing a signal dependent upon gas flowing from the leak through said selected location because of a temperature change in said at least one thermistor caused by the temperature of such flowing gas affecting said at least one thermistor;

a first process means connected to an output conductor of said at least one thermistor, said first process means having a first output conductor for providing a first signal indicating detection of a leak at said selected location, and a second output conductor for providing a second signal indicating said at least one thermistor is defective;

a process latch means connected to receive said first signal, for holding said first signal level as a first latch signal;

a second process means having a first input conductor to receive said first latch signal and a second input conductor to receive said second signal from said first process means, said second process means having light emission means for displaying respectively, the detection of a leak condition, a no-leak condition, or detection of a defective thermistor condition.

* * * * *